United States Patent [19]

Garcia et al.

[11] Patent Number: 4,672,347
[45] Date of Patent: Jun. 9, 1987

[54] MULTI-SPEED RESOLVER USING FERRITE STATOR AND ROTOR STRUCTURES

[75] Inventors: Gustavo E. Garcia, Natick, Mass.; David Gold, Tacoma Park, Md.

[73] Assignee: The Charles Stark Draper Laboratory, Inc., Cambridge, Mass.

[21] Appl. No.: 750,928

[22] Filed: Jul. 1, 1985

[51] Int. Cl.[4] .............................................. H01F 21/06
[52] U.S. Cl. .................................... 336/132; 310/111; 310/184; 310/268; 336/135
[58] Field of Search ............... 336/120, 131, 130, 135, 336/119, 132; 310/111, 155, 168, 268, 184

[56] References Cited

U.S. PATENT DOCUMENTS

| | | | |
|---|---|---|---|
| 2,442,751 | 6/1948 | Abbott | 336/135 |
| 3,041,486 | 6/1962 | Moffett | 336/135 X |
| 3,230,406 | 1/1966 | Henry-Baudot | 310/155 |
| 4,255,682 | 3/1981 | Toida et al. | 336/135 X |
| 4,458,168 | 7/1984 | Welburn | 336/120 X |

Primary Examiner—Thomas J. Kozma
Attorney, Agent, or Firm—Robert F. O'Connell

[57] ABSTRACT

A resolver which in a preferred embodiment utilizes a stator member, preferably made of a single piece of ferrite material, which has active stator sine poles and active stator cosine poles and a rotor member which has passive rotor poles. The active stator poles have excitation voltage inputs supplied thereto and, as the rotor poles rotate relative thereto, the sine and cosine stator poles supply voltage outputs which vary sinusoidally and co-sinusoidally, respectively, as a function of the angular position of the rotor member relative to the stator member. Multiple stator and rotor pole combinations can be used to provide resolver operation at different speeds.

8 Claims, 16 Drawing Figures

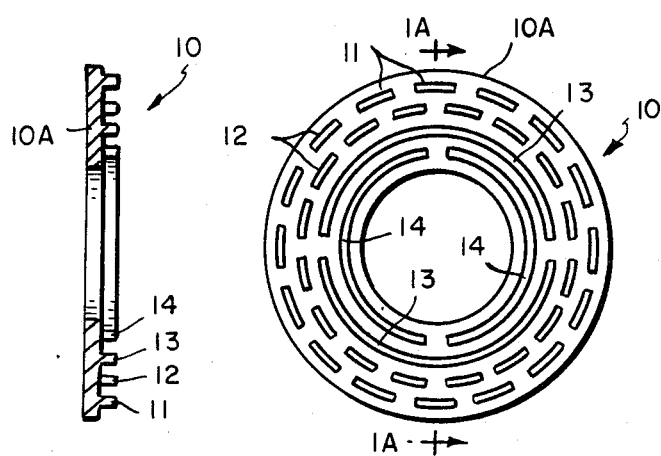
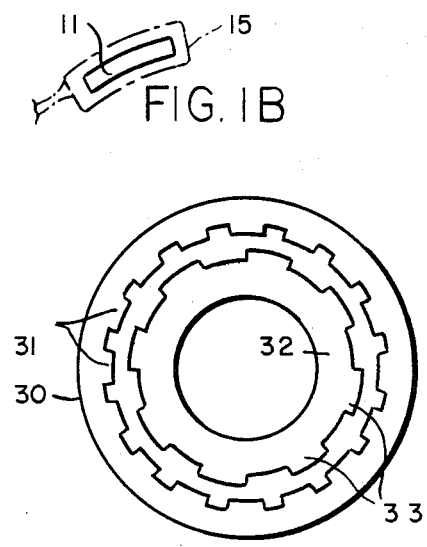
FIG.1A FIG.1 FIG.1B FIG.1C
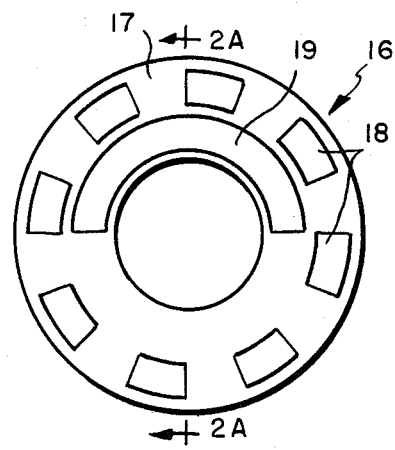
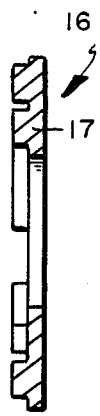
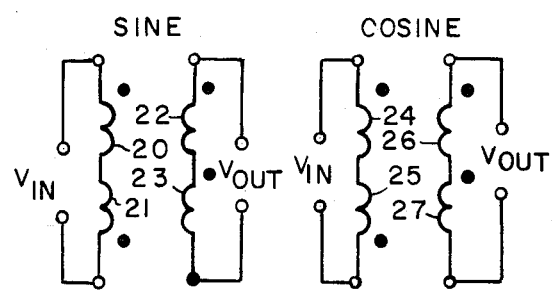
FIG.2 FIG.2A FIG.3 FIG.3A
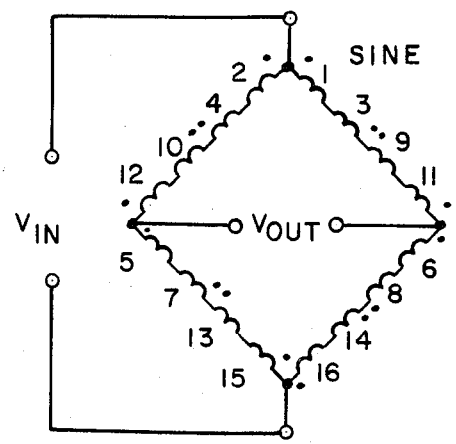
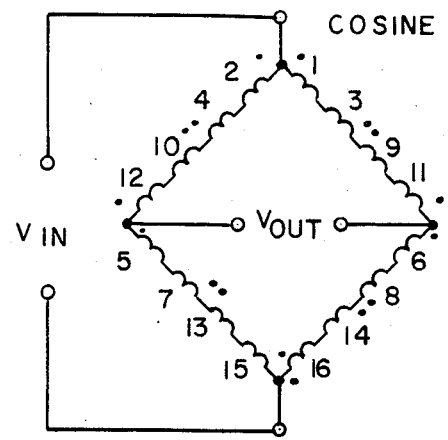
FIG.4 FIG.4A

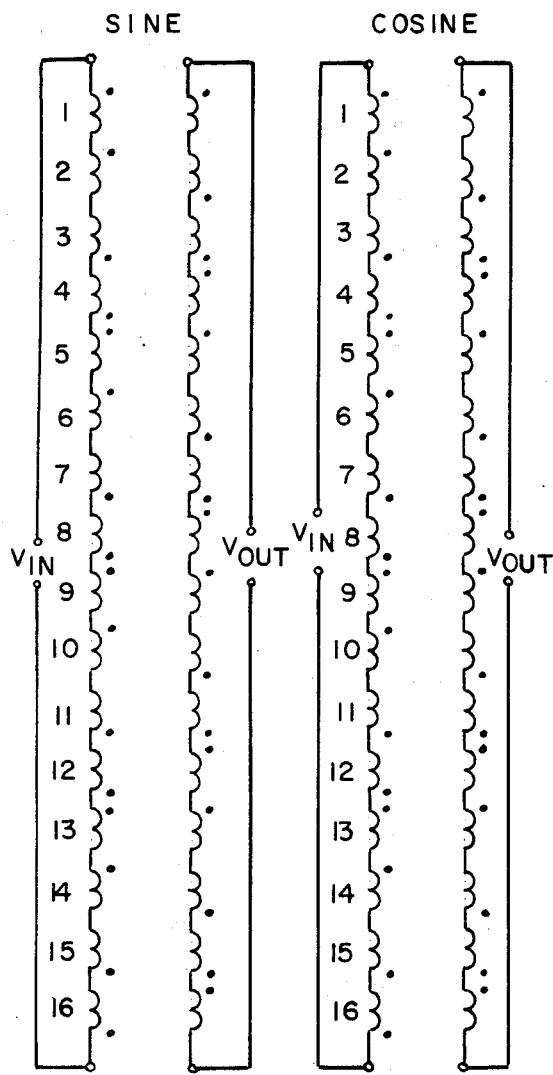
FIG.5  FIG.5A
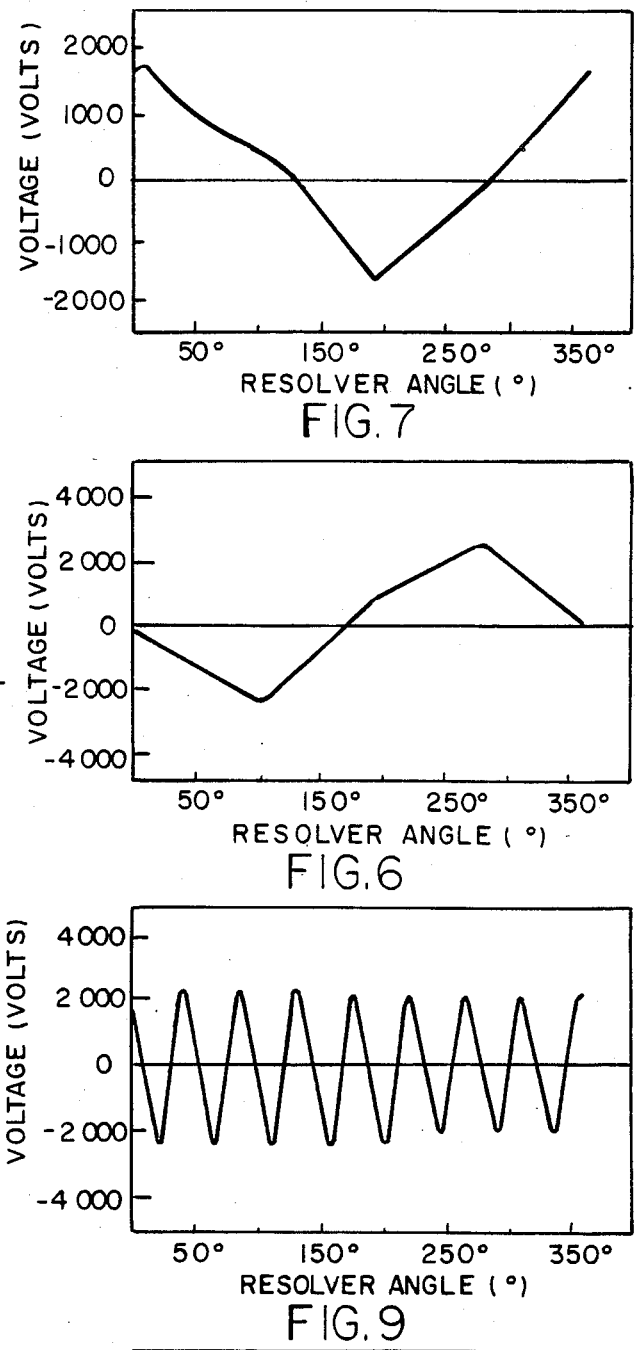
FIG.7
FIG.6
FIG.9
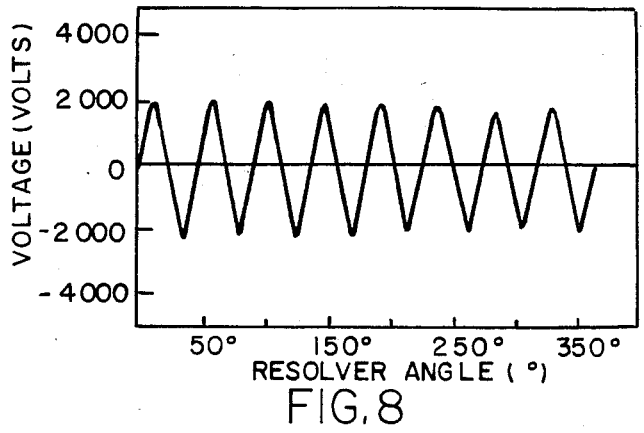
FIG.8

MULTI-SPEED RESOLVER USING FERRITE STATOR AND ROTOR STRUCTURES

INTRODUCTION

This invention relates generally to resolvers and more particularly, to a multi-speed resolvers having active stator members and passive rotor members made of ferrite material.

BACKGROUND OF THE INVENTION

In general, resolvers, sometimes referred to as "rotary inductors", are used to provide output electrical signals which vary as a function of the angular displacement of a rotating shaft and normally comprise a stator and a rotor member, most often formed of laminated high permeability magnetic material. The stator member has one or more active stator primary coils and the rotor has one or more active rotor secondary coils, the magnetic coupling between the stator and rotor coils being varied by rotation of a shaft on which the rotor is mounted. Such devices thereby transmit electrical information concerning the angular shaft position. By changing the relative orientations of the primary and secondary windings, by rotation of the rotor shaft and thereby varying the magnetic coupling therebetween, the output voltages from the rotor secondary windings are a measurement of the shaft's rotating position. Since the rotor is generally free to rotate continuously, the connections to the leads thereof have to be implemented by the use of conventional slip rings and brushes.

Such resolvers are generally considered as precision devices and in many applications require extensive fabrication and alignment procedures and compensating circuits so that the desired precision can be achieved and maintained in operation. The cost thereof can be considerable, particularly in such devices as used to sophisticated applications requiring an extremely high degree of precision.

In many other applications, however, where extremely high precision measurements are not absolutely necessary or even where high accuracy is required, it would be desirable to utilize a resolver which is much less expensive to fabricate but which has sufficient precision to provide the operation desired. In addition, in many applicatios it is often desirable to provide more than one speed of operation, i.e., where one rotor revolution provides a plurality of voltage output cycles, using the same stator/rotor combination and it is desirable to do so in a relative simple and inexpensive manner.

BRIEF SUMMARY OF THE INVENTION

In accordance with the invention, in a particular embodiment thereof, a multi-speed resolver can be obtained by utilizing an active stator member and a passive rotor member, which members are made of non-laminated ferrite material rather than the laminated high permeability magnetic material of most standard resolver constructions.

In accordance therewith, at least a first plurality of poles is provided on one surface, such as the planar surface, or the cylindrical surface, of the stator member and adjacent thereto on the same planar or cylindrical surface a second plurality of similar poles having a 90° orientation i.e., 90 electrical degrees or 90/N spatial degrees, with respect to the first poles is also provided. Thus, for a "one-speed" operation (N=1), 90 electrical degrees equals 90 spatial degrees, while for "N-speed" operation, 90° electrical degrees equals 90/N spatial degrees. Each of said poles has associated with it one or more appropriate windings either in the form of printed circuits or coils, the coils being connected in an appropriately related configuration to provide the desired operation.

A plurality of corresponding poles is placed on the planar or cylindrical surface of the rotor, such poles being passive in the sense that no active coils are associated therewith. The pole faces of the rotor and the stator members are mounted opposite each other and the rotor is placed on a freely rotating shaft so that as the rotor poles are rotated the magnetic coupling between the passive rotor poles and the active stator poles produces output voltage which are proportional to the sine and to the cosine of the shaft angle.

Because of such construction no high cost laminated magnetic material members are required, no slip rings or brushes are necessary, and relatively high voltage outputs can be obtained at relatively moderate frequencies. Moreover the costs and difficulties of construction are reduced considerably in comparison to conventional resolvers.

DESCRIPTION OF THE INVENTION

The invention can be described in more detail with the help of the accompanying drawings wherein FIG. 1 shows a plan view of the pole faces on a planar surface of the stator member of a two-speed resolver in accordance with the invention;

FIG. 1A shows a view in section along the line 1—1 of FIG. 1;

FIG. 1B shows an exemplary pole of FIG. 1 having a coil associated therewith;

FIG. 1C shows a view in section of an alternative exemplary embodiment depicts a resolver having pole faces on the cylindrical surfaces of the rotor and stator members;

FIG. 2 shows a plan view of the pole faces on a planar surface of the rotor member of the resolver of FIG. 1;

FIG. 2A shows a view in section along the line 2—2 of FIG. 2;

FIG. 3 shows exemplary connections for the primary and secondary windings of the coils of the sine stator poles of FIG. 1 for a first speed of operation;

FIG. 3A shows exemplary connections for the primary and secondary windings of the coils of the cosine stator poles at such first speed of operation;

FIG. 4 shows exemplary connection for the windings of the sine stator poles of FIG. 1 in a bridge configuration for a second speed of operation;

FIG. 4A shows exemplary connection for the windings of cosine stator poles of FIG. 1 in a bridge configuration for such second speed of operation;

FIG. 5 shows exemplary connections for the primary and secondary windings of the sine stator poles of FIG. 1 in a series configuration at the second speed of operation;

FIG. 5A shows exemplary connections of the primary and secondary windings of the cosine stator poles of FIG. 1 in a series configuration for such second speed of operation;

FIG. 6 shows a graph of an exemplary voltage output as a function of resolver shaft angle for the sine windings of the resolver of FIG. 1 at the first speed of operation;

FIG. 7 shows a graph of an exemplary voltage output as a function of resolver shaft angle for the cosine windings of the resolver of FIG. 1 at the first speed of operation;

FIG. 8, shows a graph of an exemplary voltage output as a function of resolver shaft angle for the sine windings of the resolver of FIG. 1 at the second speed of operation; and FIG. 9 shows a graph of an exemplary voltage output as a function of resolver shaft angle for the cosine windings of the resolver of FIG. 1 at the second speed of operation.

FIGS. 1, 1A and 1B show varying views of an exemplary stator member in accordance with the invention. As can be seen therein the stator 10 comprises an annular base element 10A having a first plurality of projecting pole elements 11 on a planar surface of element 10A arranged at a first radial distance from the center thereof near the periphery of the annular element 10A. Such stator poles can be identified as the "sine" stator poles. A second plurality of poles 12 are arranged on such planar surface within the first plurality of poles at a second radial distance from the center as shown. The placements of poles 12 provide a peripheral orientation of 90° (i.e., electrical degrees) with respect to the orientation of the first plurality of poles (and in this case 90°/8 in spatial degrees) and can be identified as "cosine" stator poles. Such sine and cosine stator poles will provide operation at a first speed such that, during one revolution of the rotor, the 16 sine (and cosine) poles provide eight full sine-wave (or cosine wave) voltage output cycles. Such operation can be referred to as an 8-speed operation, i.e., one in which one revolution of the rotor results in eight cycles of the output signal.

In addition, the resolver structure depicted can be arranged to provide for operation at a second speed (here referred to as a 1-speed operation wherein one revolution results in one output signal cycle) by utilizing a pair of stator sine poles 13 and a pair of stator cosine poles 14 having a 90° (electrical and spatial) peripheral orientation with respect to poles 13. One full rotation of the rotor produces a single sine wave (or cosine wave) cycle. Each of the stator poles of FIG. 1 has associated with it appropriate primary and secondary coil windings 15 as shown in dot-dash outline, for example, in FIG. 1B wherein, for example the coil windings 15 enclose an exemplary sine stator pole 11. Each of the sine and cosine stator poles is similarly structured as in FIG. 1B for both the 8-speed and the 1-speed operations.

Associated therewith and oppositely placed on a rotatable shaft (not shown) with respect to the stator poles is a rotor member 16 shown in FIGS. 2 and 2A. As can be seen therein the rotor comprises a base rotor element 17 and a first pluraity of projecting rotor poles 18 on a planar surface thereof placed near the periphery thereof and used for the 8-speed operation of the resolver and a single rotor pole 19 on such planar surface within pole 18 used for the 1-speed operation. The rotor and stator poles are oppositely disposed with respect to each other to provide the desired resolver magnetic coupling operation.

The section view of FIG. 1C depicts an alternate embodiment in which the stator poles 31 are placed along an axial direction on the inner cylindrical surface of a stator member 30 while the corresponding rotor poles 33 are placed along the axial direction on the outer cyindrical surface of a rotor member 32.

FIGS. 3 and 3A show exemplary connections for the windings utilized on the sine stator poles and the cosine stator poles, respectively, for the 1-speed operation. Thus a pair of primary windings 20 and 21 are utilized; one wound around one of the stator sine poles 13, and the other wound around the other stator sine pole together with a pair of secondary windings 22 and 23, correspondingly wound around each of the stator sine poles for 1-speed operation. The primary and secondary windings are connected in series as shown in FIG. 3 having the polarities as conventionally designed by the dots and having appropriate connections for the input excitation voltage $V_{in}$ and the output voltage $V_{out}$.

Similarly primary windings 24 and 25 and secondary windings 26 and 27 are similarly wound around the two stator cosine poles 14 in the polarities depicted in FIG. 3A and with the input and output voltages shown.

Similarly series arrangements of both the plurality of primary and secondary windings on the 16 stator cosine poles, respectively, as shown in FIGS. 5 and 5A, the primary and secondary winding pairs being designated as members 1 through 16 having the polarities shown and having the input and output voltages $V_{in}$ and $V_{out}$, respectively.

An alternative arrangement for the windings for the 8-speed operation is shown in FIGS. 4 and 4A. In accordance with such connections, sine and cosine winding arrangements are both in the form of bridge circuit connections. In such case primary and secondary windings are not used and only single windings are needed on each of the sine and cosine stator poles. The windings are again identified by number 1 through 16 associated with each of the 16 sine and cosine stator poles and the relationships among the windings and their polarities are depicted therein. The voltage input to the bridges are shown as $V_{in}$ and the voltage outputs from the bridges are shown as $V_{out}$.

Exemplary voltage outputs from the secondary windings of the 1-speed sine and cosine series configurations shown in FIGS. 3 and 3A as a function of the resolver shaft angle are depicted in the graphs of FIGS. 6 and 7 and for a particular implementation thereof the voltage output is found to be a resonable approximation to a sine and a cosine wave in each case.

For the 8-speed operation, exemplary voltage outputs from the bridge circuit configurations of FIGS. 4 and 4A are depicted in FIGS. 8 and 9 for the sine bridge windings and the cosine bridge windings, respectively. As can be seen therein, each full rotation of the shaft provides eight sine or cosine cycles. The approximations to sine and cosine waves are very close and are clearly usable in many resolver applications.

Thus the exemplary embodiments of FIGS. 1 and 2 can provide dual speed resolver operation, the pole configurations of which can be fabricated entirely of ferrite materials so that no expensive magnetic material laminations are needed. Moreover, the rotor is set up passive in its structure, all of the active windings being placed on the stator either in the form of primary/secondary series windings, for example, or in the form of the bridge circuit configurations, for example, as discussed with reference to the 8-speed configuration. The cost of constructing the active stator and passive rotor structures is relatively low compared to the cost of constructing active stator and active rotor configurations for a laminated magnetic resolver. Such ferrite components can be readily molded as single pieces, for example, and the windings thereon be fabricated either as pre-formed coils or as suitable printed circuit configurations using techniques well known to the art.

Moreover, the structure of the invention as depicted here provides reasonable voltage output levels which can be achieved by using relatively low frequencies as, for example, between 800 Hz. and 10,000 Hz. Such output levels can be favorably compared with those obtained utilizing conventional structures wherein the voltage outputs are relatively low unless much higher frequencies are used.

It has been found that a resolver made in accordance with the invention has relatively high output sensitivity with relatively low noise and that the angular resolution can be made sufficiently precise to be useful in substantially all desired applications. Such applications, for example, can include inertial navigation systems, controlled rotating tables or instruments used in the growing field of robotics, and the like.

While the invention described in the particular implementations discussed above represents preferred embodiments thereof, modifications thereto may occur to those in the art within the spirit and scope of the invention. Thus, while the radial poles shown projecting from the planar surfaces of the stator and rotor members in FIGS. 1, 1A, 2 and 2A represent an effective embodiment of the invention such poles can also be formed on the cylindrical surfaces thereof as depicted in FIG. 1C. Further, the windings associated on either the planar or cylindrical surfaces of the stator can be in the form of printed circuit winding configurations. Moreover, while the structures depicted utilize rotating members, the structures can also be configured as linear structures wherein the stator element with its poles and windings is formed in an in-line configuration and the movable element with its poles is also formed in the same in-line manner and moves along a substantially linear path adjacent the stator structure. Further while the embodiments depicted are of the two-winding type, i.e. where the sine and cosine poles and windings have a 90° spatial orientation with respect to each other, the structure may be of the three winding type, wherein three sets of poles and windings having a 120° spatial orientation with respect to each other are used.

In some applications the number of windings and number of stator poles need not be the same, i.e., for some purposes there need not be a one-to-one correspondence therebetween. Further, while the output signal wave forms in a some applications need not be exact, or precisely formed, sine or cosine waves, in some applications it may be necessary or desirable to obtain more exact waveforms thereof. To achieve such purpose the pole faces can be suitably shaped, using techniques well known to the art, to assure that exact sine or cosine waveforms will result. Moreover, such pole face shaping can be arranged to provide waveforms having shapes other than sine or cosine waves, again using techniques within the skill of the art.

As a further alternative to the straightforward Wheatstone bridge circuitry depicted in FIGS. 4 and 4A, for example, the output windings can be electrically separated from the input windings in order to avoid ground problems which may arise in the Wheatstone bridge configuration. Accordingly, the windings shown in such figures can be utilized as excitation windings and a second set of signal output windings corresponding thereto may be placed adjacent thereto and coupled magnetically to the excitation windings so that no physical electrical connections are required therebetween.

Further, the impedance of such separate output windings can be suitably tailored to the particular application involved to achieve optimum output signals therefrom using techniques known to the art. In summary, the invention, as disclosed in the above embodiment and alternatives thereto, provides an advantage in being able to provide a structure at a reasonable size and at a reasonable cost, without the use of slip rings, while still providing high accuracy in its results.

Other modifications may occur to those in the art. Hence, the invention is not to be limited to the specific embodiments disclosed except as defined by the appended claims.

What is claimed is:

1. A resolver comprising
   a stator member made of ferrite material having at least a first plurality of stator sine poles and at least a second plurality of stator cosine poles on one surface thereof, said sine poles being radially displaced and offset along the periphery from said cosine poles on said surface;
   each of said stator sine poles having at least one sine winding associated with it and each of said stator cosine poles having at least one cosine winding associated with it;
   a rotor member made of ferrite material having at least a first plurality of rotor poles on one surface thereof, said rotor member being rotatably mounted adjacent said stator member so that the poles of said members are oppositely disposed with respect to each other;
   said stator sine and stator cosine windings having an excitation voltage input applied thereto and each of said stator windings substantially continually supplying a voltage output therefrom as said rotor member is rotated relative to said stator member, the voltage output of the sine windings associated with said sine stator poles providing an output signal which varies substantially sinusoidally as said rotor rotates and the voltage output of the cosine windings associated with said stator cosine poles providing an output signal which varies substantially co-sinusoidally as said rotor rotates.

2. A resolver in accordance with claim 1 wherein said stator and rotor members are each made of a single piece of ferrite material.

3. A resolver in accordance with claim 1 wherein said stator member includes a first group of N stator sine poles and N stator cosine poles and a second group of M stator sine poles and M stator cosine poles, and said rotor member includes a second plurality of rotor poles, said first plurality of rotor poles including N/2 rotor poles and said second plurality of rotor poles including M/2 rotor poles.

4. A resolver in accordance with claim 3 wherein N equals 16 and M equals 4.

5. A resolver in accordance with claim 1 wherein said stator sine windings comprise primary and secondary windings each connected in series and said stator cosine windings comprise primary and secondary windings each connected in series, an excitation voltage input being applied across said series of primary sine windings and said sinusoidal voltage output being supplied across said series secondary sine windings; and an excitation voltage input being applied across said series primary cosine windings and said co-sinusoidal voltage output being supplied across said series secondary cosine windings.

6. A resolver in accordance with claim 1 wherein said stator sine windings are connected in a first selected bridge circuit configuration having input and output terminals, an excitation voltage input being applied to said input terminals and said sinusoidal voltage output being supplied at said output terminals; and said stator cosine windings are connected in a second selected bridge circuit configuration having input and output terminals, and excitation voltage input being applied to said input terminals and said co-sinusoidal voltage output being supplied at said output terminals.

7. A resolver in accordance with claim 1 wherein said stator and rotor poles are on a planar surface of said stator and rotor members, respectively.

8. A resolver in accordance with claim 1 wherein said stator and rotor poles are on a cylindrical surface of said stator and rotor members, respectively.

* * * * *